United States Patent
Wei

(10) Patent No.: US 11,878,243 B2
(45) Date of Patent: Jan. 23, 2024

(54) GAME UNIT CONTROL METHOD AND APPARATUS

(71) Applicant: NETEASE (HANGZHOU) NETWORK CO., LTD., Zhejiang (CN)

(72) Inventor: Yiming Wei, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 330 days.

(21) Appl. No.: 17/438,951

(22) PCT Filed: Dec. 25, 2019

(86) PCT No.: PCT/CN2019/128263
§ 371 (c)(1),
(2) Date: Sep. 14, 2021

(87) PCT Pub. No.: WO2020/215778
PCT Pub. Date: Oct. 29, 2020

(65) Prior Publication Data
US 2022/0152495 A1 May 19, 2022

(30) Foreign Application Priority Data
Apr. 22, 2019 (CN) .......................... 201910322008.2

(51) Int. Cl.
*A63F 13/533* (2014.01)
*A63F 13/2145* (2014.01)
*G06F 3/04847* (2022.01)

(52) U.S. Cl.
CPC ........ *A63F 13/533* (2014.09); *A63F 13/2145* (2014.09); *A63F 2300/1075* (2013.01); *A63F 2300/308* (2013.01); *G06F 3/04847* (2013.01)

(58) Field of Classification Search
CPC ................ A63F 13/533; A63F 13/2145; A63F 2300/1075; A63F 2300/308; G06F 3/04847
(Continued)

(56) References Cited

U.S. PATENT DOCUMENTS 8,087,986 B2 * 1/2012 Yoshizawa .......... G07F 17/3227
463/13
9,405,454 B2 * 8/2016 Lee ........................ G06F 3/0486
(Continued)

FOREIGN PATENT DOCUMENTS

| CN | 105335091 A | 2/2016 |
| CN | 105582673 A | 5/2016 |

(Continued)

OTHER PUBLICATIONS

Corresponding JP first search results issued on Nov. 25, 2022.

*Primary Examiner* — Allen Chan
(74) *Attorney, Agent, or Firm* — Qinghong Xu

(57) ABSTRACT

A game unit control method and apparatus are provided. The method includes: in response to a preset grouping trigger operation, displaying a first grouping control in a preset range of at least one game unit indicator; in response to a first grouping operation acting on the first grouping control, adjusting a coverage range of the first grouping control; and determining game units indicated by a game unit indicator corresponding to the adjusted coverage range of the first grouping control as a first group of target game units. In the present embodiment, a first grouping control is used to quickly group game units, thereby enabling a player to operate on game units of multiple classes at the same time, so as to improve the game experience of the player.

20 Claims, 7 Drawing Sheets

(58) Field of Classification Search
USPC .......................................................... 463/31
See application file for complete search history.

(56) References Cited

U.S. PATENT DOCUMENTS

| | | | |
|---|---|---|---|
| 9,870,122 B2 * | 1/2018 | Jin | ...................... G06F 3/04817 |
| 9,996,157 B2 * | 6/2018 | Chaudhri | ............ G06F 3/04845 |
| 2009/0143141 A1 * | 6/2009 | Wells | .................. G07F 17/3239 |
| | | | 463/37 |
| 2018/0365905 A1 | 12/2018 | Lane et al. | |

FOREIGN PATENT DOCUMENTS

| | | | |
|---|---|---|---|
| CN | 107433036 A | | 12/2017 |
| CN | 107864297 A | | 3/2018 |
| CN | 109011587 A | | 12/2018 |
| CN | 109078326 A | | 12/2018 |
| CN | 109240573 A | | 1/2019 |
| CN | 109513209 A | | 3/2019 |
| CN | 109568939 A | | 4/2019 |
| CN | 109621417 A | | 4/2019 |
| CN | 110193196 A | | 9/2019 |
| JP | 2012165920 A | | 9/2012 |
| JP | 2015029523 A | | 2/2015 |
| JP | 2016171874 A | | 9/2016 |
| JP | 2019-013465 A | | 1/2019 |

* cited by examiner

GAME UNIT CONTROL METHOD AND APPARATUS

TECHNICAL FIELD

The embodiments of the disclosure relate to the technical field of games, and in particular, to a game unit control method and apparatus.

BACKGROUND

With the development of a mobile communication technology, more and more mobile terminal games have emerged. Due to the limitations of hardware conditions and interaction modes, most of the control modes in traditional PC-side games cannot be transplanted to mobile terminal games, this also makes the mobile terminal games and the traditional PC-side games greatly different in control modes.

At present, when controlling game units in mobile terminal games, it is usually necessary to operate a single game unit or game units in a preset class or group. The existing technology is not convenient enough and inefficient to operate multiple/multiple classes of/multiple groups of game units, which leads to the decline of player's game experience.

SUMMARY

The embodiments of the disclosure provide a game unit control method and apparatus to overcome the problems of insufficient convenience and low efficiency in the selection and control operations of game units.

In a first aspect, an embodiment of the disclosure provides a game unit control method, which may be applicable to a terminal rendered with a graphical user interface. The graphical user interface may include a control display area. The control display area may include multiple game unit indicators. Each of the game unit indicators may be used for indicating at least one corresponding game unit. The method may include: in response to a preset grouping trigger operation, a first grouping control is displayed in a preset range of at least one game unit indicator; in response to a first grouping operation acting on the first grouping control, a coverage range of the first grouping control is adjusted; and game units indicated by a game unit indicator corresponding to the coverage range of the adjusted first grouping control are determined as a first group of target game units.

In a possible design, the operation that in response to the preset grouping trigger operation, the first grouping control is displayed in the preset range of at least one game unit indicator may include that: in response to an unit selection operation acting on the first game unit indicator of the graphical user interface, the first game unit indicator is highlighted in a preset manner and a position of the first game unit indicator is determined; and the first grouping control is displayed at a position corresponding to the position of the first game unit indicator.

In an optional embodiment, the operation that in response to the first grouping operation acting on the first grouping control, the coverage range of the first grouping control is adjusted may include that: in response to an expansion operation acting on the first grouping control, the first grouping control is length-extended; and a coverage range of the first grouping control is adjusted according to a length of the length-extended first grouping control.

In an optional embodiment, after game units indicated by the game unit indicator corresponding to the adjusted coverage range of the first grouping control are determined as the first group of target game units, the method may further include: in response to a selection operation acting on a target game unit indicator, a game unit indicated by the target game unit indicator is determined as a target game unit to be controlled; or in response to a selection operation acting on the first grouping control, a game unit indicated by a game unit indicator corresponding to the coverage range of the first grouping control is determined as a target game unit to be controlled.

In an optional embodiment, after game units indicated by the game unit indicator corresponding to the adjusted coverage range of the first grouping control are determined as the first group of target game units, the method may further include: in response to a first grouping deletion operation acting on a target game unit indicator, at least one game unit indicated by the target game unit indicator is deleted from the first group of target game units; or in response to a second grouping deletion operation acting on the first grouping control, the length of the first grouping control is reduced and at least one game unit corresponding to the shortened part of the first grouping control is deleted from the first group of target game units.

In an optional embodiment, after game units indicated by the game unit indicator corresponding to the adjusted coverage range of the first grouping control are determined as the first group of target game units, the method may further include: in response to a moving operation acting on the first grouping control, the first grouping control and a corresponding game unit indicator are moved to a target position.

In an optional embodiment, after game units indicated by the game unit indicator corresponding to the adjusted coverage range of the first grouping control are determined as the first group of target game units, the method may further include: in response to a second selection operation acting on a second game unit indicator, a second grouping control is displayed at a position corresponding to a position of the second game unit indicator; in response to a second grouping operation acting on the second grouping control, a coverage range of the second grouping control is adjusted; and different types of game units indicated by a game unit indicator corresponding to the adjusted coverage range of the second grouping control are determined as a second group of target game units.

In an optional embodiment, after game units indicated by a game unit indicator corresponding to the adjusted coverage range of the second grouping control are determined as a second group of target game units, the method may further include: in response to a combining operation acting on the first grouping control and the second grouping control, the first grouping control and the second grouping control are combined to obtain a third grouping control; and different types of game units indicated by a game unit indicator corresponding to a coverage range of the third grouping control are determined as a third group of target game units.

In a second aspect, an embodiment of the disclosure provides a game unit control apparatus, which may be applicable to a terminal rendered with a graphical user interface. The graphical user interface may include a control display area. The control display area may include multiple game unit indicators. Different game unit indicators may correspond to different types of game units. The apparatus may include:

a display module, configured to in response to a preset grouping trigger operation, display a first grouping control in a preset range of at least one game unit indicator;

an adjustment module, configured to in response to a first grouping operation acting on the first grouping control, adjust a coverage range of the first grouping control; and a determination module, configured to determine game units indicated by a game unit indicator corresponding to the coverage range of the adjusted first grouping control as a first group of target game units.

In an optional embodiment, the display module may be specifically configured to:

in response to an unit selection operation acting on the first game unit indicator of the graphical user interface, highlight the first game unit indicator in a preset manner and determine a position of the first game unit indicator; and display the first grouping control at a position corresponding to the position of the first game unit indicator.

In an optional embodiment, the adjustment module may be specifically configured to:

in response to an expansion operation acting on the first grouping control, length-extend the first grouping control; and adjust a coverage range of the first grouping control according to the length of the length-extended first grouping control.

In an optional embodiment, the determination module may be further configured to:

After determining game units indicated by a game unit indicator corresponding to the adjusted coverage range of the first grouping control as a first group of target game units, in response to a control operation acting on a target game unit indicator, determine a game unit indicated by the target game unit indicator as a target game unit to be controlled; or in response to a selection operation acting on the first grouping control, determine a game unit indicated by a game unit indicator corresponding to the coverage range of the first grouping control as a target game unit to be controlled.

In an optional embodiment, the determination module may be further configured to:

after determining game units indicated by a game unit indicator corresponding to the adjusted coverage range of the first grouping control as a first group of target game units, in response to a first grouping deletion operation acting on a target game unit indicator, delete a game unit indicated by the target game unit indicator from the first group of target game units; or in response to a second grouping deletion operation acting on the first grouping control, reduce the length of the first grouping control and delete a game unit corresponding to the shortened part of the first grouping control from the first group of target game units.

In an optional embodiment, the determination module may be further configured to:

after determining game units indicated by a game unit indicator corresponding to the adjusted coverage range of the first grouping control as a first group of target game units, in response to a moving operation acting on the first grouping control, move the first grouping control and a game unit indicator corresponding to the first grouping control to a target position.

In an optional embodiment, the determination module may be further configured to:

After determining game units indicated by a game unit indicator corresponding to the adjusted coverage range of the first grouping control as a first group of target game units, in response to a second selection operation acting on a second game unit indicator, display a second grouping control at a position corresponding to a position of the second game unit indicator;

in response to a second grouping operation acting on the second grouping control, adjust a coverage range of the second grouping control; and determine game units indicated by a game unit indicator corresponding to the adjusted coverage range of the second grouping control as a second group of target game units.

In an optional embodiment, the determination module may be further configured to:

After determining game units indicated by a game unit indicator corresponding to the adjusted coverage range of the second grouping control as a second group of target game units, in response to a combining operation acting on the first grouping control and the second grouping control, combine the first grouping control and the second grouping control to obtain a third grouping control; and determine different types of game units indicated by a game unit indicator corresponding to a coverage range of the third grouping control as a third group of target game units.

In a third aspect, an embodiment of the disclosure provides a game unit control device, which may include:

a memory, configured to store a program; and a processor, configured to execute the program stored in the memory. When the program is executed, the processor may be configured to perform the method described in the first aspect and any of various possible designs of the first aspect.

In a fourth aspect, an embodiment of the invention provides a non-transitory computer storage medium, which may include instructions that, when run on a computer, cause the computer to perform the method described in the first aspect and any of various possible designs of the first aspect.

A game unit control method and apparatus are provided. The method includes that: in response to a preset grouping trigger operation, a first grouping control is displayed in a preset range of at least one game unit indicator. In response to a first grouping operation acting on the first grouping control, a coverage range of the first grouping control is adjusted. Game units indicated by a game unit indicator corresponding to the adjusted coverage range of the first grouping control are determined as a first group of target game units. A first grouping control is displayed through a preset grouping trigger operation, and then the first grouping control is operated to quickly group game units corresponding to a coverage range of the first grouping control, thus avoiding the problems of insufficient convenience and low efficiency in the selection and control operations of game units, and improving the game experience of players.

BRIEF DESCRIPTION OF THE DRAWINGS

In order to more clearly illustrate the technical solutions in the embodiments of the disclosure or the conventional art, the drawings used in the description of the embodiments or the conventional art will be briefly described below. It is apparent that the drawings in the following description are some embodiments of the disclosure, and other drawings can be obtained from those skilled in the art according to these drawings without any creative work.

DETAILED DESCRIPTION OF THE EMBODIMENTS

In order to make the unitives, technical solutions, and advantages of the embodiments of the disclosure clearer, the technical solutions in the embodiments of the disclosure will be clearly and completely described below with reference to the drawings in the embodiments of the disclosure. It is apparent that the described embodiments are a part of the embodiments of the disclosure, not all of the embodiments. All other embodiments obtained by those of ordinary skill in the art based on the embodiments of the disclosure without creative efforts should fall within the scope of protection of the disclosure.

Figure 1:
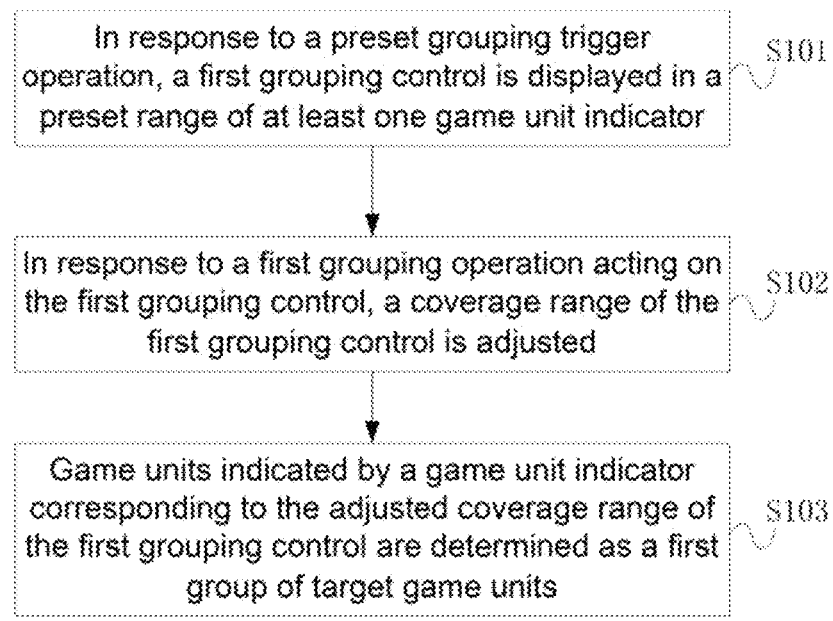
FIG. 1 is a flowchart 1 of an optional game unit control method provided by one embodiment of the disclosure.

FIG. 1 is a flowchart 1 of an optional game unit control method provided by an embodiment of the disclosure. As shown in FIG. 1, the method includes the following steps.

In step S101, in response to a preset grouping trigger operation, a first grouping control is displayed in a preset range of at least one game unit indicator.

The present embodiment is applicable to a terminal rendered with a graphical user interface. Specifically, the graphical user interface refers to a computer operation user interface displayed in a graphical manner, which allows a user to use an input device to manipulate icons or menu controls on a screen. The input device may be, for example, a mouse or a touch screen, etc. The present embodiment is not limited thereto. During the game, a user operates through the graphical user interface to interact with a client or a server.

In the present embodiment, the graphical user interface includes a control display area. The control display area includes multiple game unit indicators. Each of the game unit indicators is used for indicating at least one corresponding game unit.

A game unit indicator may be used for indicating a single game unit; or, a game unit indicator may also be used for indicating a type of game units, for example, the type of game units may be lancer, infantry, etc. At least one game unit is included in a class of game units. A specific game type may be set according to the actual game, which is not limited herein; or, a game unit indicator may also be used for indicating a group of game units, the group may be a set of game units preset by game players/users or game applications. The set may contain multiple game units of different types or multiple game units of the same type, which is not limited herein.

Optionally, the control display area may further include preset function controls, game menus, etc. Here, the control display area is not limited. The control display area may be stacked and displayed above a game scene, for example, the control display area may also be located on the left side of the game scene, etc., and the embodiments of the disclosure do not specifically limit the specific implementation manner of the control display area.

Further, a player inputs a preset grouping trigger operation on the graphical user interface through an input device (for example, a touch operation medium). Wherein the grouping trigger operation may be, for example, a touch operation (for example, a click operation) acting on a game unit indicator, or sliding selection of multiple game unit indicators, or a long-press operation within a preset range of the game unit indicator, or touch of a preset control, etc. The embodiment of the disclosure does not specifically limit the specific implementation manner of the grouping trigger operation, and the specific implementation manner thereof may be set according to requirements.

Secondly, the first grouping control is displayed in a preset range of at least one game unit indicator by responding to the grouping trigger operation. Wherein the preset range of the first game unit indicator may be, for example, a circular range within a preset radius range where a set center of the first game unit indicator is the center of circle, or the preset range may be a range of corresponding position of the first game unit indicator in an actual game scene. The setting of the preset range may be selected according to actual requirements, which will not be limited herein.

Wherein the first grouping control is used for indicating grouping of game units. In an optional implementation manner, the first grouping control may be set, for example, in the form of a slider bar, and displayed above the selected game unit indicator. For example, it may also be set in the form of a rectangular button, and arranged on the left side of the game unit indicator. Or, it may also be set in the form of a rectangular frame to surround and cover the corresponding game unit indicator. The present embodiment does not limit the specific implementation manner of the first grouping control.

In step S102, in response to a first grouping operation acting on the first grouping control, a coverage range of the first grouping control is adjusted.

In an optional implementation manner, for example, when the first grouping control is a slider bar, the first grouping operation may be, for example, an operation of dragging one end of the first grouping control to length-extend the first grouping control, or may also be an operation of pinching to shorten the first grouping control.

In another optional implementation manner, for example, when the first grouping control is a button, the first grouping operation may be, for example, clicking the first grouping control or long-pressing the first grouping control, etc. The specific implementation form for the first grouping operation is not particularly limited herein, and those skilled in the art can understand that the specific setting of the first grouping operation may be selected according to actual requirements.

Further, the coverage range of the first grouping control is adjusted according to the first grouping operation. For example, when the first grouping operation is to length-extend the first grouping control or shorten the first grouping control, the coverage range of the first grouping control will change. The change in the coverage range may be, for example, the change in the coverage range in a length direction.

Or, for example, it may also be a change in the coverage area, and the specific adjustment to the coverage range of the first grouping control is determined according to a setting mode of the first grouping control, and the implementation manner of adjusting the coverage range is not limited herein.

In step S103, game units indicated by a game unit indicator corresponding to the adjusted coverage range of the first grouping control are determined as a first group of target game units.

Further, game unit indicators corresponding to the coverage range of the first grouping control include at least one game unit indicator. Secondly, game units indicated by a game unit indicator corresponding to the coverage range of the first grouping control are determined as a first group of target game units.

Wherein the target game units classified as the first group may be controlled by a player as a target group (grouping). Optionally, the game units in the target group may perform specified game operations or game tasks at the same time. For example, during the game battle, target game units in a first group is directly selected as game units to be operated, so that repeated selection operations by the player multiple times can be avoided, thereby improving the game experience of the player.

In an optional embodiment, if the coverage range of the first grouping control is not adjusted after the first grouping control is displayed, game units indicated by a game unit indicator corresponding to the coverage range of the first grouping control in an initial case are determined as a first group of target game units.

An optional game unit control method provided by the embodiment of the disclosure includes that: in response to a preset grouping trigger operation, a first grouping control is displayed in a preset range of at least one game unit indicator. In response to a first grouping operation acting on the first grouping control, a coverage range of the first grouping control is adjusted. Game units indicated by a game unit indicator corresponding to the adjusted coverage range of the first grouping control are determined as a first group of target game units. A first grouping control is displayed through a preset grouping trigger operation, then the first grouping control is operated to quickly group game units corresponding to a coverage range of the first grouping control, and selected target game units (a first group of target game units) may be conveniently, quickly and dynamically adjusted as required, thus avoiding the problems of insufficient convenience and low efficiency in the selection and control operations of game units, and improving the game experience of players.

Figure 2:
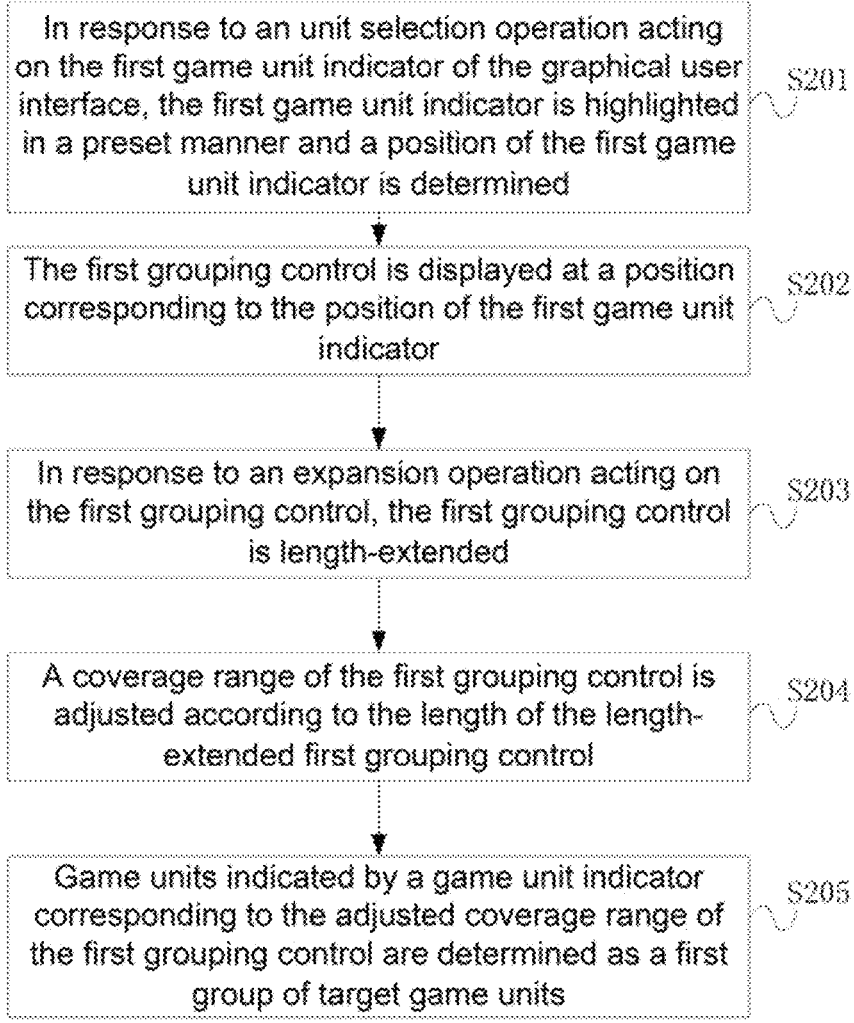
FIG. 2 is a flowchart 2 of an optional game unit control method provided by one embodiment of the disclosure.
Figure 3:
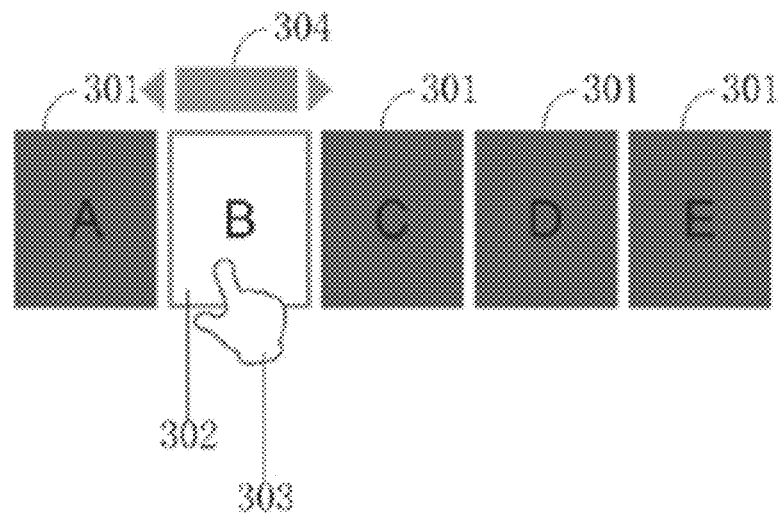
FIG. 3 is a schematic diagram 1 of an interface of an optional game unit control method provided by one embodiment of the disclosure.
Figure 4A:
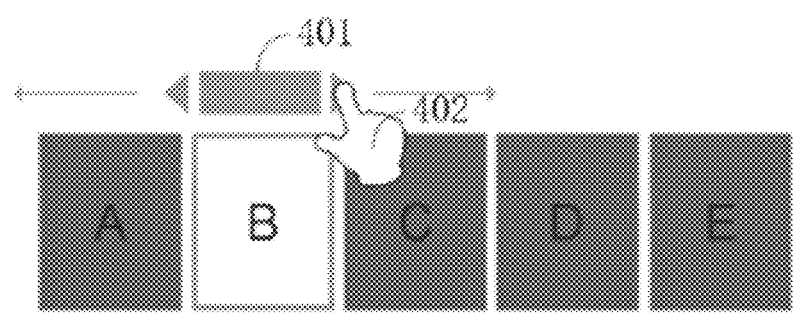
FIG. 4A is a schematic diagram 2 of an interface of an optional game unit control method provided by one embodiment of the disclosure.
Figure 4B:
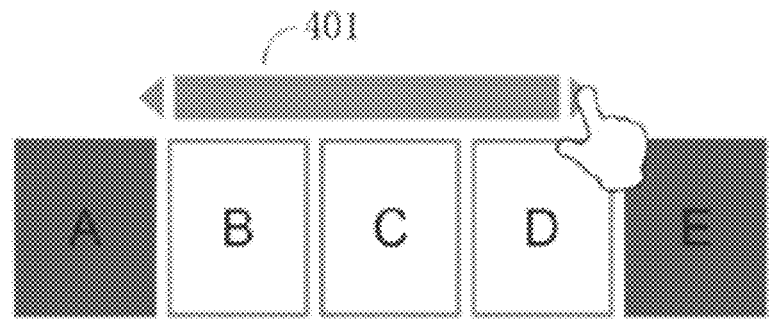
FIG. 4B is a schematic diagram 3 of an interface of an optional game unit control method provided by one embodiment of the disclosure.

Based on the above embodiments, an optional game unit control method provided by the embodiment of the disclosure will be further described in detail below with reference to FIG. 2 to FIG. 4. FIG. 2 is a flowchart 2 of an optional game unit control method according to one embodiment of the disclosure. FIG. 3 is a schematic diagram 1 of an interface of an optional game unit control method provided by one embodiment of the disclosure. FIG. 4A is a schematic diagram 2 of an interface of an optional game unit control method provided by one embodiment of the disclosure. FIG. 4B is a schematic diagram 3 of an interface of an optional game unit control method provided by one embodiment of the disclosure.

As shown in FIG. 2, the operation that in response to a preset grouping trigger operation and a first grouping control is displayed in a preset range of at least one game unit indicator may be implemented by the method provided by step S201 to step S205.

In step S201, in response to an unit selection operation acting on the first game unit indicator of the graphical user interface, the first game unit indicator is highlighted in a preset manner and a position of the first game unit indicator is determined.

In the present embodiment, the grouping trigger operation is to perform an unit selection operation on the first game unit indicator. Wherein the first game unit indicator may be, for example, a game unit indicator, and a single game unit indicator is operated by a click operation or a long-press operation, thus selecting the first game unit indicator.

Optionally, the first game unit indicator may, for example, also be multiple game unit indicators. Multiple game unit indicators are selected through a sliding operation to select the first game unit indicator. In the present embodiment, the first game unit indicator and the unit selection operation are not limited.

Further, the first game unit indicator is highlighted in a preset manner. Wherein the preset manner may be, for example, highlight display, or may be displayed according to a preset color, or a preset identifier may be displayed on the first game unit indicator, which is not specifically limited herein.

Secondly, the position of the first game unit indicator in the control display area is determined.

In step S202, the first grouping control is displayed at a position corresponding to the position of the first game unit indicator.

Further, a display position of the first grouping control is determined in the control display area. The position corresponding to the position of the first game unit indicator is the position within the preset range of the first game unit indicator.

For example, the first grouping control may be displayed above the first game unit indicator. In the present embodiment, the display position of the first grouping control is not particularly limited, as long as the setting position of the first grouping control corresponds to the first game unit indicator.

The following describes an optional implementation manner of the first grouping control in conjunction with FIG. 3. As shown in FIG. 3, the control display area 30 includes multiple game unit indicators 301. It is assumed that the first selected game unit indicator is 302 and that the unit selection operation is a click operation.

Optionally, multiple game unit indicators 301 may be arranged in multiple lines, for example, arranged in a rectangular form of N*M, where N and M are positive integers. The coverage range of the first grouping control may be the nearest row or column of game unit indicators, or the coverage range of the first grouping control may be the nearest N rows or M columns of game unit indicators, or other mapping coverage manners, which will not be limited herein. Optionally, the first grouping control may be in a straight bar shape (for example, as shown in FIG. 3), or in a bent shape (for example, bent at a right angle), or other shapes, which will not be limited herein.

Then, in response to an unit selection operation 303 acting on the first game unit indicator 302, the first game unit indicator 302 is highlighted, and the effect of the highlight is indicated by a shadow effect in FIG. 3. Then, the position of the first game unit indicator 302 in the control display area 30 is determined.

Further, the first grouping control 304 is displayed above the first game unit indicator 302, and the first grouping control is used as a slider bar for description here. The first grouping control 304 may also be, for example, arranged on the left side of the first game unit indicator 302, etc.

Those skilled in the art may understand that the above description in conjunction with FIG. 3 is only a schematic description, and the first game unit indicator may also be, for example, two game unit indicators, which are arranged at the top of the graphical user interface, etc. The remaining implementation manners are similar and will not be repeated here.

In step S203, in response to an expansion operation acting on the first grouping control, the first grouping control is length-extended.

In step S204, a coverage range of the first grouping control is adjusted according to the length of the length-extended first grouping control.

Specifically, an extension operation is performed on the first grouping control, so as to realize the length extension of the first grouping control. The extension operation may be, for example, dragging a side of the first grouping control to realize the length extension of the first grouping control, and may also be pinching the first grouping control to realize the length extension of the first grouping control. The present embodiment does not limit the specific implementation manner of the extension operation.

Further, after the length is extended, the length of the first grouping control changes, and the corresponding coverage range also changes. The change in the coverage range corresponds to the length extension. In an optional implementation manner, when the first grouping control is a slider bar, the lengthwise coverage range of the first grouping range is adjusted to the length of the first grouping control after the length extension.

In another optional implementation manner, for example, when the first grouping control is a rectangular frame, adjusting the length and width directions of the first grouping control according to the length of the length-extended first grouping control corresponds to the length of length extension. The present embodiment does not limit the specific implementation manner of adjusting the coverage range of the first grouping control.

The specific implementation of adjusting the coverage range of the first grouping control will be described in detail below using FIG. 4A and FIG. 4B as an example. As shown in FIG. 4A, a first grouping control 401 is displayed in the control display area, and then an extension operation 402 is performed on the first grouping control 401. Specifically, the left area of the first grouping control 401 is long-pressed to slide leftwards, thereby realizing the length extension of the first grouping control 401.

Further, as shown in FIG. 4B, the length of the length-extended first grouping control 401 changes, and the coverage range of the first grouping control 401 is adjusted according to the length of the first grouping control 401 at this time. As shown in FIG. 4B, the coverage range of the first grouping control 401 is covered with three game unit indicators at this time, which are game unit indicators identified as B, C, and D. The game unit indicators may be highlighted to indicate that game units corresponding to the game unit indicator are selected currently.

In step S205, game units indicated by a game unit indicator corresponding to the adjusted coverage range of the first grouping control are determined as a first group of target game units.

The implementation manner of step S205 is similar to step S203, and will not be repeated here.

An optional game unit control method provided by the embodiment of the disclosure includes that: in response to an unit selection operation acting on the first game unit indicator of the graphical user interface, the first game unit indicator is highlighted in a preset manner and a position of the first game unit indicator is determined. The first grouping control is displayed at a position corresponding to the position of the first game unit indicator. In response to an expansion operation acting on the first grouping control, the first grouping control is length-extended. A coverage range of the first grouping control is adjusted according to the length of the length-extended first grouping control. Game units indicated by a game unit indicator corresponding to the adjusted coverage range of the first grouping control are determined as a first group of target game units. By highlighting the first game unit indicator in a preset manner, a player can quickly determine the selected game unit indicator, and secondly, by extending the first grouping control, game units corresponding to the adjusted coverage range of the first grouping control can be quickly and effectively determined as a group of game units, so that the player can quickly divide and determine the group of game units, thereby improving the game experience of the player.

Based on the above embodiments, after determining the first group of target game units, regardless of whether the group of game units is selected, the grouped game units are maintained in the grouping state. Secondly, when the game units need to be selected for game operation, the game units contained in the first group of target game units can be selected individually or completely.

Figure 5A:
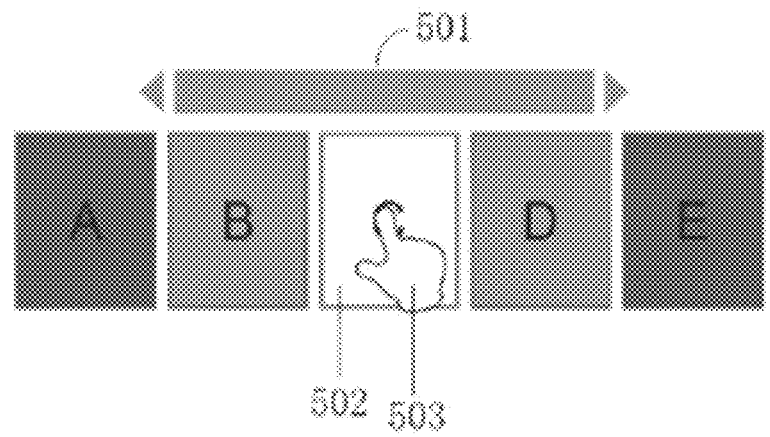
FIG. 5A is a schematic diagram 4 of an interface of an optional game unit control method provided by one embodiment of the disclosure.
Figure 5B:
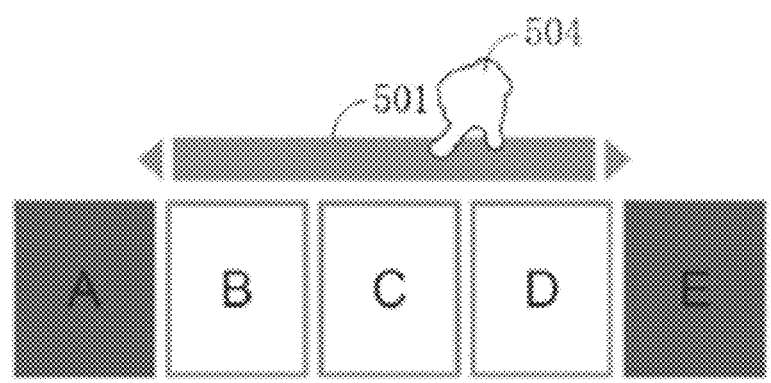
FIG. 5B is a schematic diagram 5 of an interface of an optional game unit control method provided by one embodiment of the disclosure.

The following is a detailed introduction in conjunction with FIG. 5A and FIG. 5B. FIG. 5A is a schematic diagram 4 of an interface of an optional game unit control method provided by one embodiment of the disclosure. FIG. 5B is a schematic diagram 5 of an interface of an optional game unit control method provided by one embodiment of the disclosure.

First, the implementation manner of selecting a single game unit indicator in the first group of target game units will be described with reference to FIG. 5A.

Specifically, in response to a selection operation acting on a target game unit indicator, a game unit indicated by the target game unit indicator is determined as a target game unit to be controlled.

In the present embodiment, at this time, the first group of target game units is in an unselected state, and the target game unit indicator is a game unit indicator to be selected among the game unit indicators corresponding to the first group of target game units. Secondly, a selection operation is performed on the target game unit indicator. The selection operation may be, for example, a click operation, or a long-press operation, which is not limited herein.

Further, in response to the selection operation acting on the target game unit indicator, a game unit indicated by the target game unit indicator is determined as a target game unit to be controlled. As shown in FIG. 5A, game units corresponding to the game unit indicators B, C, and D covered by the length direction of a first grouping control 501 are the first group of target game units. It is assumed that the game unit indicator C is a target game unit indicator 502.

Secondly, in response to a selection operation 503 acting on the target game unit indicator 502, the target game unit indicator 502 is highlighted. Secondly, a game unit indicated by the target game unit indicator 502 is determined as a target game unit to be controlled, so that the game unit indicated by the target game unit indicator 502 can be controlled to perform the corresponding game operation and the like.

Then, the implementation manner of selecting game units corresponding to all game unit indicators in the first group of target game units will be described with reference to FIG. 5B.

In response to a selection operation acting on the first grouping control, a game unit indicated by a game unit indicator corresponding to the coverage range of the first grouping control is determined as a target game unit to be controlled.

In the present embodiment, at this time, the first group of target game units is in an unselected state, and the game unit indicators corresponding to the coverage of the first grouping control are all game unit indicators corresponding to the first group of target game units. Secondly, a selection operation is performed on the first grouping control. Wherein the selection operation is similar to that described above, and will not be repeated here.

Further, in response to the selection operation acting on the first grouping control, a game unit indicated by a game unit indicator corresponding to the coverage range of the first grouping control is determined as a target game unit to be controlled. As shown in FIG. 5B, game units corresponding to the game unit indicators B, C, and D corresponding to the coverage range of the first grouping control 501 are the first group of target game units.

Secondly, in response to a selection operation 504 acting on the first grouping control 501, the first grouping control 501 and the game unit indicators B, C, and D corresponding to the coverage range of the first grouping control 501 are highlighted to determine a game unit indicated by the game unit indicator corresponding to the coverage range of the first grouping control as a target game unit to be controlled, thereby controlling the game unit indicated by the first grouping control 501 to perform the corresponding game operation and the like.

An optional game unit control method provided by the embodiment of the disclosure includes that: in response to a selection operation acting on a target game unit indicator, a game unit indicated by the target game unit indicator is determined as a target game unit to be controlled; or, in response to a selection operation acting on the first grouping control, a game unit indicated by a game unit indicator corresponding to the coverage range of the first grouping control is determined as a target game unit to be controlled. Through the selection operation acting on the target game unit indicator, it is possible to quickly select the game unit indicated by a single game unit indicator in the first group of target game units. Therefore, after the game units are grouped, the player can still select the game units as required. Or through the selection operation acting on the first grouping control, it is possible to quickly select all game units contained in the first group of target game units, thereby improving the game operation efficiency of the player.

Figure 6A:
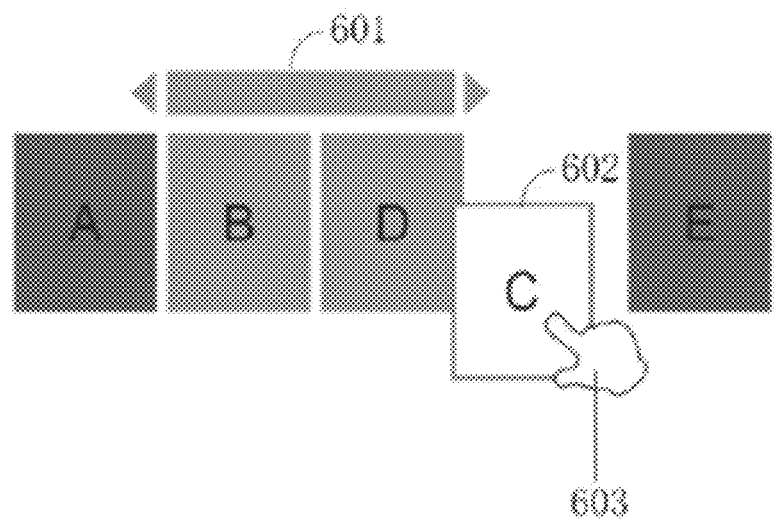
FIG. 6A is a schematic diagram 6 of an interface of an optional game unit control method provided by one embodiment of the disclosure.
Figure 6B:
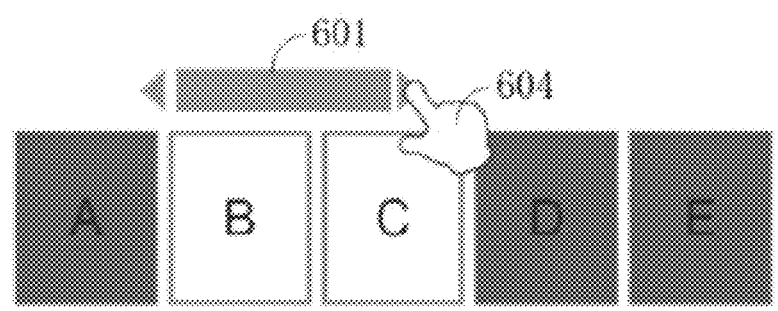
FIG. 6B is a schematic diagram 7 of an interface of an optional game unit control method provided by one embodiment of the disclosure.

Based on the above embodiments, after determining the first group of target game units, an optional game unit control method provided by the disclosure can delete game units contained in the first group of target game units. The following is a detailed introduction in conjunction with FIG. 6A and FIG. 6B. FIG. 6A is a schematic diagram 6 of an interface of an optional game unit control method provided by one embodiment of the disclosure. FIG. 6B is a schematic diagram 7 of an interface of an optional game unit control method provided by one embodiment of the disclosure.

First, referring to FIG. 6A, an implementation manner of deleting a game unit according to the operation of the game unit pointer is introduced.

Specifically, in response to a first grouping deletion operation acting on a target game unit indicator, at least one game unit indicated by the target game unit indicator is deleted from the first group of target game units.

In the present embodiment, the target game unit indicator is a game unit indicator to be deleted among the game unit indicators corresponding to the first group of target game units. Secondly, a first grouping deletion operation is performed on the target game unit indicator. Wherein the first grouping deletion operation may be, for example, a drag operation, or a long-press operation on the target game unit indicator. The first grouping deletion operation is not limited herein.

Further, in response to the first grouping deletion operation acting on the target game unit indicator, a game unit indicated by the target game unit indicator is deleted from the group of target game units. As shown in FIG. 6A, game units corresponding to the game unit indicators B, C, and D covered by the length direction of a first grouping control 601 are the first group of target game units. It is assumed that the game unit indicator C is a target game unit indicator 602.

Secondly, in response to a first grouping deletion operation 603 acting on the target game unit indicator 602, the target game unit indicator 602 is highlighted, and then a game unit indicated by the target game unit indicator 602 is deleted from the first group of target game units. At this time, the game units contained in the first group of target game units are the game units indicated by the game unit indicators B and D.

Optionally, for example, the remaining game unit indicators after deleting the target game unit indicator may be displayed in a preset order. As shown in FIG. 5A, after deleting the game unit indicator C, the game unit indicator B and the game unit indicator D are closely arranged to avoid blanks in the control display area after deletion, so as to improve the utilization efficiency of a user interface.

Next, referring to FIG. 6B, an implementation manner of deleting a game unit according to the operation of the first grouping control is introduced.

The length of the first grouping control is reduced in response to a second grouping deletion operation acting on the first grouping control, and a game unit corresponding to the shortened part of the first grouping control is deleted from the first group of target game units.

In the present embodiment, a second grouping deletion operation is performed on the first grouping control. Wherein the second grouping deletion operation may be, for example, sliding one end of the first grouping control, or may also be pinching of the first grouping control, etc. The present embodiment does not limit the specific implementation manner of the first grouping control.

Further, in response to the second grouping deletion operation acting on the first grouping control, the length of the first grouping control is reduced. As shown in FIG. 6B, game units corresponding to the game unit indicators B, C, and D covered in the length direction of the first grouping control 601 are the first group of target game units.

Secondly, in response to the second grouping deletion operation 604 acting on the first grouping control 601, the length of the first grouping control 601 is reduced, and secondly, a game unit corresponding to the shortened part of the first grouping control is determined as a game unit to be deleted, that is, the game unit indicator D illustrated in FIG. 6B, and the game unit corresponding to the game unit indicator D is deleted from the first group of target game units.

The game unit selection method provided by the embodiment of the disclosure includes that: in response to a first grouping deletion operation acting on a target game unit indicator, a game unit indicated by the target game unit indicator is deleted from the first group of target game units; or in response to a second grouping deletion operation acting on the first grouping control, the length of the first grouping control is reduced, and a game unit corresponding to the shortened part of the first grouping control is deleted from the first group of target game units. By performing the first grouping deletion operation on the target unit indicator or the second grouping deletion operation on the first grouping control, the game units contained in the first group of target game units are deleted, so that the grouped game units can be deleted from the group quickly and effectively to realize the expansion of a control mode of the game units, and the first group of target units can be adjusted efficiently and flexibly.

Figure 7A:
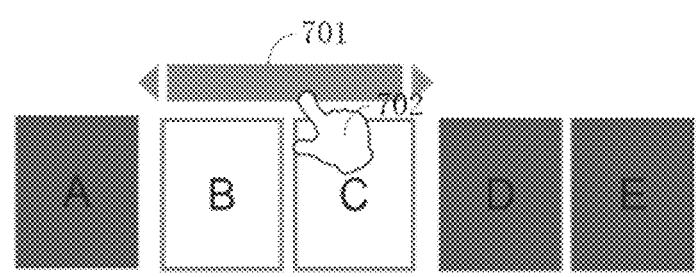
FIG. 7A is a schematic diagram 8 of an interface of an optional game unit control method provided by one embodiment of the disclosure.
Figure 7B:
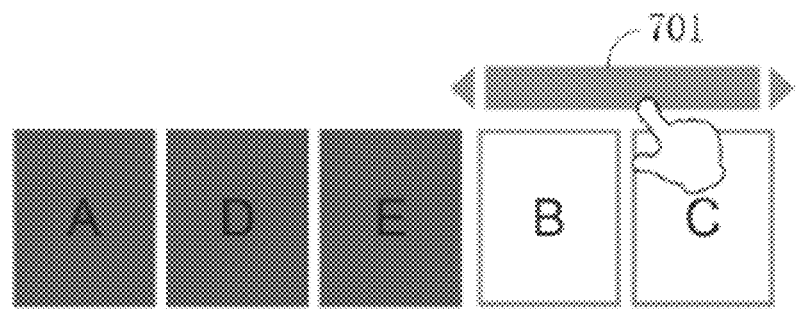
FIG. 7B is a schematic diagram 9 of an interface of an optional game unit control method provided by one embodiment of the disclosure.

Based on the above embodiments, after determining the first group of target game units, an optional game unit control method provided by the embodiment of the disclosure can also move the display position of the first grouping control and the corresponding game unit indicator in the second display area. The following is a detailed introduction in conjunction with FIG. 7A and FIG. 7B. FIG. 7A is a schematic diagram 8 of an interface of an optional game unit control method provided by one embodiment of the disclosure. FIG. 7B is a schematic diagram 9 of an interface of an optional game unit control method provided by one embodiment of the disclosure.

Specifically, in response to a moving operation acting on the first grouping control, the first grouping control and a corresponding game unit indicator are moved to a target position.

The moving operation may be, for example, a sliding operation, or a multi-click operation. The specific implementation manner of the moving operation is not limited in the present embodiment. Further, in response to the moving operation acting on the first grouping control, the first grouping control and corresponding game unit indicators are moved to a target position. The target position may be, for example, a stop position of the moving operation, or may also be, for example, a position corresponding to the control of the stop position of the moving operation, etc., which is not limited herein.

FIG. 7A and FIG. 7B are described below. As shown in FIG. 7A, the first grouping control 701 is located at a first position, and then a moving operation 702 is performed on the first grouping control 701. After the moving operation, as shown in FIG. 7B, the first grouping control 701 and the corresponding game unit indicators B and C are located at a target position, thereby realizing the movement of the first grouping control and the corresponding game unit indicators.

According to an optional game unit control method provided by the embodiment of the disclosure, a moving operation is performed on a first grouping control, so that the first grouping control and corresponding game unit indicators are moved to a target position, thereby enabling a user to move a display position of the grouped game unit indicators, which extends the operability of the game.

Figure 8:
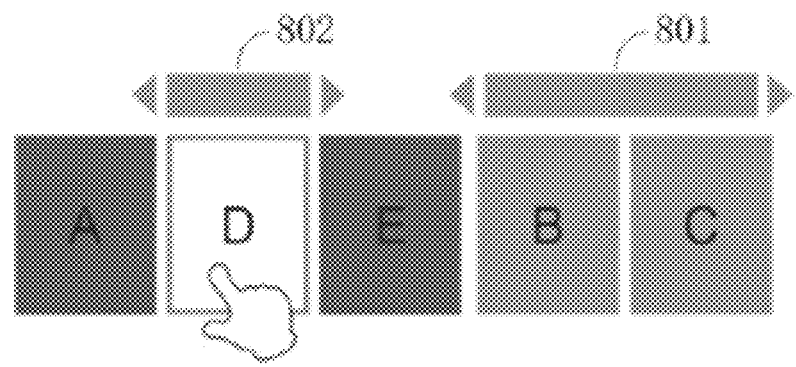
FIG. 8 is a schematic diagram 10 of an interface of an optional game unit control method provided by one embodiment of the disclosure.

Based on the above embodiments, after determining the first group of target game units, an optional game unit control method provided by the disclosure can also determine a second group of target game units and maintain the first group of target game units in a grouping state. The following is a detailed introduction in conjunction with FIG. 8. FIG. 8 is a schematic diagram 10 of an interface of an optional game unit control method provided by one embodiment of the disclosure.

Specifically, in response to a second selection operation acting on a second game unit indicator, a second grouping control is displayed at a position corresponding to a position of the second game unit indicator.

In response to a second grouping operation acting on the second grouping control, a coverage range of the second grouping control is adjusted.

Game units indicated by a game unit indicator corresponding to the coverage range of the adjusted second grouping control are determined as a second group of target game units.

The implementation manner of determining the second group of target game units is similar to the implementation manner of determining the first group of target game units. For specific operations, reference may be made to the foregoing embodiments, and details are not described here.

As shown in FIG. 8, the game unit indicators corresponding to the first grouping control 801 are B and C. At this time, the game unit indicators B and C are in an unselected state, but still maintain the grouping state. The first grouping control 801 is used for indication.

Secondly, the game unit indicator corresponding to the second grouping control 802 is D. At this time, the game unit indicator D is in a selected state and highlighted.

An optional game unit control method provided by the embodiment of the disclosure includes that: in response to a second selection operation acting on a second game unit indicator, a second grouping control is displayed at a position corresponding to a position of the second game unit indicator; in response to a second grouping operation acting on the second grouping control, a coverage range of the second grouping control is adjusted; and game units indicated by a game unit indicator corresponding to the adjusted coverage range of the second grouping control are determined as a second group of target game units. In the state that the first group of target game units remains grouped, the second group of target game units can still be determined, so that players can freely group multiple game units, and it is convenient for players to select game units according to the group.

Figure 9:
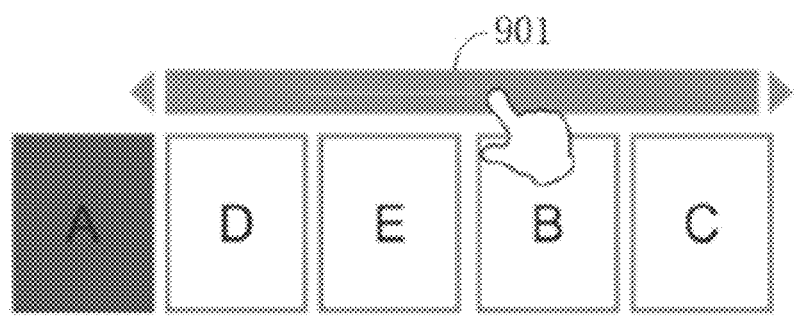
FIG. 9 is a schematic diagram 11 of an interface of an optional game unit control method provided by one embodiment of the disclosure.

Based on the above embodiments, the method provided by the embodiment of the disclosure can also combine two game units in different groups. The following is a detailed introduction in conjunction with FIG. 8 and FIG. 9. FIG. 9 is a schematic diagram 11 of an interface of an optional game unit control method provided by one embodiment of the disclosure.

Specifically, in response to a combining operation acting on the first grouping control and the second grouping control, the first grouping control and the second grouping control are combined to obtain a third grouping control.

The combining operation may be, for example, a sliding operation, thereby extending a display area of the first grouping control to the second grouping control, and may also be, for example, clicking the first grouping control and the second grouping control, thereby achieving combination.

Further, the first grouping control and the second grouping control are combined to obtain a third grouping control.

Different types of game units indicated by a game unit indicator corresponding to a coverage range of the third grouping control are determined as a third group of target game units.

Specifically, the game unit indicator corresponding to the coverage range of the third grouping control includes the game unit indicator corresponding to the first grouping control, and also includes the game unit indicator corresponding to the second grouping control. Further, when there are redundant game unit indicators between the first grouping control and the second grouping control, the game unit indicators covered by the length direction of the third grouping control also include the redundant game unit indicators.

As shown in FIG. 8, a first game unit indicator 801 and a second game unit indicator 802 are included. By performing a combining operation 803 on the first game unit indicator 801 and the second game unit indicator 802, the schematic diagram shown in FIG. 9 is obtained.

As shown in FIG. 9, the first grouping control and the second grouping control are combined to obtain a third grouping control 901. The game unit indicator corresponding to the coverage range of the third grouping control includes: game unit indicators B and C covered by the length direction of the first grouping control, a game unit indicator D covered by the length direction of the second grouping control, and a middle game unit indicator E.

Secondly, different types of game units indicated by the game unit indicators B, C, D and E covered by the length direction of the third grouping control 901 are determined as a third group of target game units.

Optionally, an optional game unit control method provided by the present embodiment can perform a combining operation on any number of game unit indicators. The implementation manner is similar, and details are not described herein.

Further optionally, if a player only wants to combine the game unit indicators corresponding to the first grouping control and the second grouping control, but does not want to combine the redundant game units there between, the first grouping control or the second grouping control may be moved, and then the combining operation is performed after the position is close.

An optional game unit control method provided by the embodiment of the disclosure includes that: in response to a combining operation acting on the first grouping control and the second grouping control, the first grouping control and the second grouping control are combined to obtain a third grouping control; and different types of game units indicated by a game unit indicator corresponding to a coverage range of the third grouping control are determined as a third group of target game units. By combining a first grouping control and a second grouping control, game units of different groups can be combined to obtain one group, thereby extending the operability of the game and improving the operation efficiency of the game.

Figure 10:
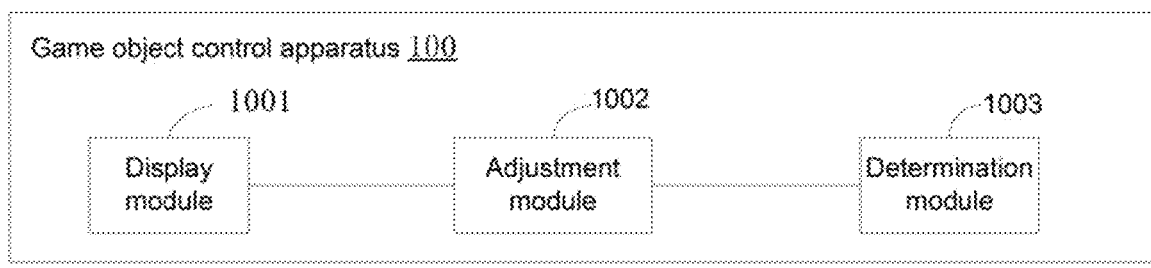
FIG. 10 is a schematic structure diagram of a game unit control apparatus provided by one embodiment of the disclosure.

FIG. 10 is a schematic structure diagram of a game unit control apparatus provided by an embodiment of the disclosure. As shown in FIG. 10, an apparatus 100 includes: a display module 1001, an adjustment module 1002 and a determination module 1003.

The display module 1001 is configured to in response to a preset grouping trigger operation, and display a first grouping control in a preset range of at least one game unit indicator.

The adjustment module 1002 is configured to in response to a first grouping operation acting on the first grouping control, and adjust a coverage range of the first grouping control.

The determination module 1003 is configured to determine game units indicated by a game unit indicator corresponding to the adjusted coverage range of the first grouping control as a first group of target game units.

Optionally, the display module 1001 is specifically configured to:
  In response to an unit selection operation acting on the first game unit indicator of the graphical user interface, highlight the first game unit indicator in a preset manner and determine a position of the first game unit indicator; and
  display the first grouping control at a position corresponding to the position of the first game unit indicator.

Optionally, the adjustment module 1002 is specifically configured to:
  In response to an expansion operation acting on the first grouping control, length-extend the first grouping control; and
  adjust a coverage range of the first grouping control according to the length of the length-extended first grouping control.

Optionally, the determination module 1003 is further configured to:
  After determining game units indicated by a game unit indicator corresponding to the adjusted coverage range of the first grouping control as a first group of target game units, in response to a control operation acting on a target game unit indicator, determine a game unit indicated by the target game unit indicator as a target game unit to be controlled; or
  In response to a selection operation acting on the first grouping control, determine a game unit indicated by a game unit indicator corresponding to the coverage range of the first grouping control as a target game unit to be controlled.

Optionally, the determination module 1003 is further configured to:
  After determining game units indicated by a game unit indicator corresponding to the adjusted coverage range of the first grouping control as a first group of target game units, in response to a first grouping deletion operation acting on a target game unit indicator, delete a game unit indicated by the target game unit indicator from the first group of target game units; or
  reduce the length of the first grouping control in response to a second grouping deletion operation acting on the first grouping control, and delete a game unit corresponding to the shortened part of the first grouping control from the first group of target game units.

Optionally, the determination module 1003 is further configured to:

After determining game units indicated by a game unit indicator corresponding to the adjusted coverage range of the first grouping control as a first group of target game units, in response to a moving operation acting on the first grouping control, move the first grouping control and a game unit indicator corresponding to the first grouping control to a target position.

Optionally, the determination module 1003 is further configured to:

After determining game units indicated by a game unit indicator corresponding to the adjusted coverage range of the first grouping control as a first group of target game units, in response to a second selection operation acting on a second game unit indicator, display a second grouping control at a position corresponding to a position of the second game unit indicator;

in response to a second grouping operation acting on the second grouping control, adjust a coverage range of the second grouping control; and determine game units indicated by a game unit indicator corresponding to the adjusted coverage range of the second grouping control as a second group of target game units.

Optionally, the determination module 1003 is further configured to:

After determining game units indicated by a game unit indicator corresponding to the adjusted coverage range of the second grouping control as a second group of target game units, in response to a combining operation acting on the first grouping control and the second grouping control, combine the first grouping control and the second grouping control to obtain a third grouping control; and determine different types of game units indicated by a game unit indicator corresponding to a coverage range of the third grouping control as a third group of target game units.

The apparatus provided in the present embodiment may be used to execute the technical solutions of the foregoing method embodiments, and the implementation principles and technical effects are similar. The present embodiment will not be described here.

It is to be noted that the display module 1001, the adjustment module 1002 and the determination module 1003 may be run in a computer terminal as part of the device. The functions implemented by the above modules may be executed by a processor in the computer terminal. The terminal may also be a smart phone (such as an Android phone or an iOS phone), a tablet computer, a palmtop, a Mobile Internet Device (MID), a PAD, or other terminal devices.

The various functional units provided by the embodiments of the disclosure may be run in a mobile terminal, a computer terminal or a similar computation device, or may be stored as part of the storage medium.

Therefore, an embodiment of the disclosure may provide a computer terminal, which may be any computer terminal device in a computer terminal group. Optionally, in the present embodiment, the computer terminal may also be replaced with a terminal device such as a mobile terminal.

Optionally, in the present embodiment, the computer terminal may be located in at least one of multiple network devices in a computer network.

In the present embodiment, the above computer terminal may execute program codes of the following steps in a game unit control method: in response to a preset grouping trigger operation, displaying a first grouping control in a preset range of at least one game unit indicator; in response to a first grouping operation acting on the first grouping control, adjusting a coverage range of the first grouping control; and determining game units indicated by a game unit indicator corresponding to the adjusted coverage range of the first grouping control as a first group of target game units.

Optionally, the computer terminal may include: one or more processors, memories and transmission devices.

The memory may be configured to store a software program and a module, such as a program instruction/module corresponding to the game unit control method and apparatus in the embodiment of the present invention, and the processor executes various functional disclosures and data processing by running the software program and the module stored in the memory, that is, implements the above game unit control method. The memory may include a high speed random access memory and may also include a non-volatile memory such as one or more magnetic storage devices, a flash memory, or other non-volatile solid state memories. In some examples, the memory may further include memories remotely located relative to the processor, which may be connected to the terminal over a network. The examples of such networks include, but are not limited to, the Internet, the Intranet, local area networks, mobile communication networks, and combinations thereof.

The transmission device is configured to receive or send data via a network. The above specific network example may include a wired network and a wireless network. In one example, the transmission device includes a Network Interface Controller (NIC) that may be connected to other network devices and routers through cables to communicate with the Internet or a local area network. In one example, the transmission device is a Radio Frequency (RF) module for communicating with the Internet wirelessly.

Specifically, the memory is configured to store information of preset action conditions and preset authority users, and application programs.

The processor may call the information and the application program stored in the memory through the transmission device to execute the program code of the method steps of each optional or preferred embodiment in the above method embodiments.

Those skilled in the art can understand that the computer terminal may also be a terminal device such as a smart phone (such as an Android phone or an iOS phone), a tablet, a pocket computer, a MID and a PAD.

Those of ordinary skill in the art can understand that all or part of the steps in various methods of the above embodiments may be completed by a program to instruct the related hardware of the terminal device. The program may be stored in a non-transitory computer storage medium. The storage medium may include a flash disk, a Read-Only Memory (ROM), a Random Access Memory (RAM), a magnetic disk or an optical disk, and the like.

Figure 11:
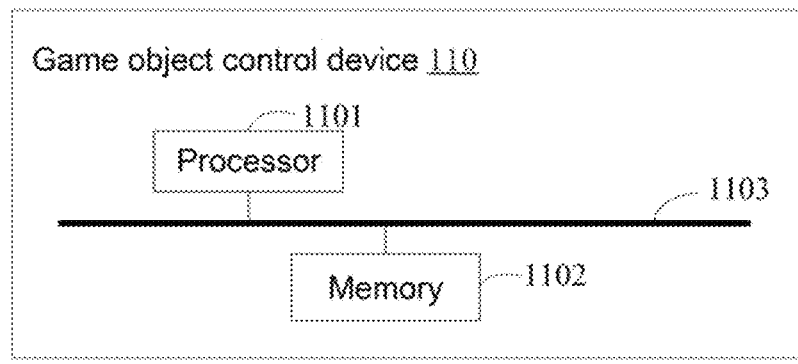
FIG. 11 is a schematic hardware structure diagram of a game unit control device provided by one embodiment of the disclosure.

FIG. 11 is a schematic hardware structure diagram of a game unit control device provided by an embodiment of the disclosure. As shown in FIG. 11, a server 110 of the present embodiment includes: a processor 1101 and a memory 1102.

The memory 1102 is configured to store a computer-executable instruction.

The processor 1101 is configured to execute the computer-executable instruction stored in the memory to implement various steps performed by the game unit control method in the above embodiments. For details, reference may be made to the related description in the foregoing method embodiments.

Optionally, the memory 1102 may be independent or integrated with the processor 1101.

When the memory 1102 is independently provided, corresponding to the game unit control device, an embodiment of the disclosure also provides a non-transitory computer storage medium that stores a computer-executable instruction. When the processor executes the computer-executed instruction, the game unit control method performed by the game unit control device is implemented.

In some embodiments provided by the disclosure, it is to be understood that the disclosed device and method may be implemented in another manner. For example, the device embodiment described above is only schematic, and for example, division of the modules is only logic function division, and other division manners may be adopted during practical implementation. For example, multiple modules may be combined or integrated into another system, or some characteristics may be neglected or not executed. In addition, coupling or direct coupling or communication connection between each displayed or discussed component may be indirect coupling or communication connection, implemented through some interfaces, of the device or the modules, and may be electrical and mechanical or adopt other forms.

The integrated module realized in the form of a software functional module may be stored in the non-transitory computer storage medium. The software functional module is stored in a storage medium, including a plurality of instructions enabling a computer device (which may be a personal computer, a server, a network device or the like) or a processor to execute part of the steps of the method in each embodiment of the disclosure.

It should be understood that the processor may be a Central Processing Unit (CPU), or may be other general purpose processors, a Digital Signal Processor (DSP), an Application Specific Integrated Circuit (ASIC), and the like. The general purpose processor may be a microprocessor, or the processor may also be any conventional processor, etc. The steps of the method disclosed in combination with the present invention may be directly embodied as a hardware processor for execution and completion, or a combination of hardware and software modules in the processor for execution and completion.

The memory may include a high-speed RAM, may also include a Non-Volatile Memory (NVM) such as at least one magnetic disk memory, and may also be a U disk, a mobile hard disk, a ROM, a magnetic disk, or an optical disk.

The bus may be an Industry Standard Architecture (ISA) bus, a Peripheral Component (PCI) bus, or an Extended Industry Standard Architecture (EISA) bus. The bus may be divided into an address bus, a data bus, a control bus, and the like. For ease of representation, the bus in the drawings of the disclosure does not limit to only one bus or one type of bus.

The above storage medium may be implemented by any type of volatile or non-volatile storage device or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a ROM, a magnetic memory, a flash memory, a magnetic disk or an optical disk. The storage medium may be any available medium that can be accessed by a general purpose or special purpose computer.

Those of ordinary skill in the art may understand that all or part of the steps of the foregoing method embodiments may be completed by a program instructing relevant hardware. The foregoing program may be stored in a non-transitory computer storage medium. When the program is executed, the steps including the foregoing method embodiments are performed. The foregoing storage medium includes various media capable of store program codes, such as a ROM, a RAM, a magnetic disk, or an optical disk.

Finally, it is to be noted that the above embodiments are only used to illustrate the technical solutions of the disclosure, and are not limited thereto. Although the disclosure has been described in detail with reference to the foregoing embodiments, those skilled in the art should understand that the technical solutions described in the foregoing embodiments are modified, or some or all technical features are equivalently replaced, but the modifications and replacements do not make the essence of the corresponding technical solutions depart from the scope of the technical solutions of various embodiments of the disclosure.

What is claimed is:

1. A game unit control method, applied to a terminal rendered with a graphical user interface, the graphical user interface comprising a control display area, the control display area comprising a plurality of game unit indicators, each of the game unit indicators being used for indicating at least one game unit, the method comprising:
   in response to a preset grouping trigger operation, displaying a first grouping control in a preset range of at least one game unit indicator;
   in response to a first grouping operation acting on the first grouping control, adjusting a coverage range of the first grouping control; and
   determining game units indicated by a game unit indicator corresponding to the coverage range of the adjusted first grouping control as a first group of target game units.

2. The method as claimed in claim 1, wherein in response to the preset grouping trigger operation, displaying the first grouping control in the preset range of the at least one game unit indicator comprises:
   in response to an unit selection operation acting on the first game unit indicator, highlighting the first game unit indicator in a preset manner and determining a position of the first game unit indicator; and
   displaying, the first grouping control at a position corresponding to the position of the first game unit indicator.

3. The method as claimed in claim 1, wherein in response to the first grouping operation acting on the first grouping control, adjusting the coverage range of the first grouping control comprises:
   in response to an expansion operation acting on the first grouping control, length-extending the first grouping control; and
   adjusting, according to a length of the length-extended first grouping control, a coverage range of the first grouping control.

4. The method as claimed in claim 1, wherein after using game units indicated by the game unit indicator corresponding to the coverage range of the adjusted first grouping control as the first group of target game units, the method further comprises:
   in response to a selection operation acting on a target game unit indicator, determining at least one game unit indicated by the target game unit indicator as at least one target game unit to be controlled; or in response to a selection operation acting on the first grouping control, determining at least one game unit indicated by a game unit indicator corresponding to the coverage range of the first grouping control as at least one target game unit to be controlled.

5. The method as claimed in claim 1, wherein after using game units indicated by the game unit indicator corresponding to the coverage range of the adjusted first grouping control as the first group of target game units, the method further comprises:
in response to a first grouping deletion operation acting on a target game unit indicator, removing at least one game unit indicated by the target game unit indicator from the first group of target game units; or
in response to a second grouping deletion operation acting on the first grouping control, reducing the length of the first grouping control, and removing at least one game unit corresponding to the shortened part of the first grouping control from the first group of target game units.

6. The method as claimed in claim 1, wherein after determining game units indicated by the game unit indicator corresponding to the coverage range of the adjusted first grouping control as the first group of target game units, the method further comprises:
in response to a moving operation acting on the first grouping control, moving the first grouping control and a game unit indicator corresponding to the first grouping control to a target position.

7. The method as claimed in claim 1, wherein after determining game units indicated by the game unit indicator corresponding to the coverage range of the adjusted first grouping control as the first group of target game units, the method further comprises:
in response to a second selection operation acting on a second game unit indicator, displaying a second grouping control at a position corresponding to a position of the second game unit indicator;
in response to a second grouping operation acting on the second grouping control, adjusting a coverage range of the second grouping control; and
determining game units indicated by a game unit indicator corresponding to the coverage range of the adjusted second grouping control as a second group of target game units.

8. The method as claimed in claim 7, wherein after determining game units indicated by the game unit indicator corresponding to the coverage range of the adjusted second grouping control as the second group of target game units, the method further comprises:
in response to a combining operation acting on the first grouping control and the second grouping control, combining the first grouping control with the second grouping control to obtain a third grouping control; and
determining game units indicated by a game unit indicator corresponding to a coverage range of the third grouping control as a third group of target game units.

9. A game unit control device, comprising:
a memory, configured to store a program; and
a processor, configured to execute the program stored in the memory, wherein when the program is executed, the processor is configured to perform the method according to claim 1.

10. A non-transitory computer storage medium, comprising instructions that, when run on a computer, cause the computer to perform the method according to claim 1.

11. A game unit control apparatus, applied to a terminal rendered with a graphical user interface, the graphical user interface comprising a control display area, the control display area comprising a plurality of game unit indicators, each of the game unit indicators being used for indicating at least one corresponding game unit, the apparatus comprising:
a display module, configured to in response to a preset grouping trigger operation, display a first grouping control in a preset range of at least one game unit indicator;
an adjustment module, configured to in response to a first grouping operation acting on the first grouping control, adjust a coverage range of the first grouping control; and
a determination module, configured to determine game units indicated by a game unit indicator corresponding to the coverage range of the adjusted first grouping control as a first group of target game units.

12. The apparatus as claimed in claim 11, wherein the display module is specifically configured to:
in response to an unit selection operation acting on the first game unit indicator of the graphical user interface, highlight the first game unit indicator in a preset manner and determine a position of the first game unit indicator; and
display the first grouping control at a position corresponding to the position of the first game unit indicator.

13. The apparatus as claimed in claim 11, wherein the adjustment module is specifically configured to:
in response to an expansion operation acting on the first grouping control, length-extend the first grouping control; and
according to the length of the length-extended first grouping control, adjust a coverage range of the first grouping control.

14. The apparatus as claimed in claim 11, wherein the determination module is further configured to:
after determining game units indicated by a game unit indicator corresponding to the adjusted coverage range of the first grouping control as a first group of target game units, in response to a selection operation acting on a target game unit indicator, determine a game unit indicated by the target game unit indicator as a target game unit to be controlled; or
in response to a selection operation acting on the first grouping control, determine a game unit indicated by a game unit indicator corresponding to the coverage range of the first grouping control as a target game unit to be controlled.

15. The apparatus as claimed in claim 11, wherein the determination module is further configured to:
after determining game units indicated by a game unit indicator corresponding to the adjusted coverage range of the first grouping control as a first group of target game units, in response to a first grouping deletion operation acting on a target game unit indicator, delete a game unit indicated by the target game unit indicator from the first group of target game units; or
in response to a second grouping deletion operation acting on the first grouping control, reduce the length of the first grouping control and delete a game unit corresponding to the shortened part of the first grouping control.

16. The apparatus as claimed in claim 11, wherein the determination module is further configured to:

after determining game units indicated by a game unit indicator corresponding to the adjusted coverage range of the first grouping control as a first group of target game units, in response to a moving operation acting on the first grouping control, move the first grouping control and a game unit indicator corresponding to the first grouping control to a target position.

17. The apparatus as claimed in claim 11, wherein the determination module is further configured to:

after determining game units indicated by a game unit indicator corresponding to the adjusted coverage range of the first grouping control as a first group of target game units, in response to a second selection operation acting on a second game unit indicator, display a second grouping control at a position corresponding to a position of the second game unit indicator;

in response to a second grouping operation acting on the second grouping control, adjust a coverage range of the second grouping control; and determine game units indicated by a game unit indicator corresponding to the adjusted coverage range of the second grouping control as a second group of target game units.

18. The apparatus as claimed in claim 17, wherein the determination module is further configured to:

after determining game units indicated by a game unit indicator corresponding to the adjusted coverage range of the second grouping control as a second group of target game units, in response to a combining operation acting on the first grouping control and the second grouping control, combining the first grouping control and the second grouping control to obtain a third grouping control; and determine different types of game units indicated by a game unit indicator corresponding to a coverage range of the third grouping control as a third group of target game units.

19. A game unit control device, comprising:

a memory, configured to store a program; and a processor, configured to execute the program stored in the memory, wherein when the program is executed, the processor is configured to perform the method according to claim 2.

20. A non-transitory computer storage medium, comprising instructions that, when run on a computer, cause the computer to perform the method according to claim 2.

* * * * *